United States Patent
Yamauchi (10) Patent No.: US 8,063,984 B2
(45) Date of Patent: Nov. 22, 2011

(54) SUBTITLE DETECTION APPARATUS, SUBTITLE DETECTION METHOD AND PULL-DOWN SIGNAL DETECTION APPARATUS

(75) Inventor: Himio Yamauchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1288 days.

(21) Appl. No.: 11/717,963

(22) Filed: Mar. 13, 2007

(65) Prior Publication Data

US 2007/0222895 A1    Sep. 27, 2007

(30) Foreign Application Priority Data

Mar. 24, 2006  (JP) .................................. 2006-083927

(51) Int. Cl.
  *H04N 5/14*  (2006.01)
  *H04N 9/64*  (2006.01)
  *H04N 11/20*  (2006.01)
(52) U.S. Cl. ..................... 348/448; 348/700; 382/176
(58) Field of Classification Search .................. 348/700, 348/701, 441, 97, 564, 448; 382/176, 190, 382/195

See application file for complete search history.

(56) References Cited

U.S. PATENT DOCUMENTS

| 6,185,329 | B1 * | 2/2001 | Zhang et al. | 382/176 |
| 6,621,927 | B1 * | 9/2003 | Mori et al. | 382/173 |
| 7,623,576 | B1 * | 11/2009 | Hui et al. | 375/240.26 |
| 2002/0012393 | A1 * | 1/2002 | Tanase et al. | 375/240.01 |
| 2002/0135697 | A1 * | 9/2002 | Wredenhagen et al. | 348/448 |
| 2003/0098924 | A1 * | 5/2003 | Adams et al. | 348/448 |

FOREIGN PATENT DOCUMENTS

| JP | 06-261260 | 9/1994 |
| JP | 07-288780 | 10/1995 |
| JP | 2002-057993 | 2/2002 |
| JP | 2004-032234 | 1/2004 |
| JP | 2004-064431 | 2/2004 |
| JP | 2004-201010 | 7/2004 |

* cited by examiner

*Primary Examiner* — Victor Kostak
(74) *Attorney, Agent, or Firm* — Blakely, Sokoloff, Taylor & Zafman LLP (57) ABSTRACT

An integration circuit divides a screen, which is composed of an input video signal, into regions, integrates absolute values of inter-field differences that are included the respective regions, and provides an intra-region integration value SDA. A dynamic range calculation circuit divides the screen into regions and calculates a dynamic range SDR of luminance in each of the regions. If the intra-region integration value SDA is greater than a comparison threshold value FDT and if the dynamic range SDR of luminance in each of the regions is greater than a comparison threshold value DCT, the region is determined to be a subtitle region.

15 Claims, 10 Drawing Sheets

| Current field signal s1 | Ae | Ao | Be | Bo | Ce | Co | De | Do | Ee | Eo | Fe | Fo | Ge | Go |

FIG. 12A

| 1-field delay signal S2 | Ae | Ao | Bo | Be | Co | Ce | Do | De | Eo | Ee | Fo | Fe | Go | Ge |

FIG. 12B

| 2-field delay signal S3 | Ae | Ao | Be | Bo | Ce | Co | De | Do | Ee | Eo | Fe | Fo | Ge | Go |

FIG. 12C

Correlation between frames (S1 and S3): P1 | Weak | Weak | Strong | Weak | Weak | Weak | Weak | Weak | Weak | Weak | Strong | Weak | Weak | Weak |

FIG. 12D

Correlation between frames (S1 and S2): | Weak | Strong | Weak | Strong | Weak | Strong | Weak | Strong | Weak | Strong | Weak | Strong | Weak | Strong |

SUBTITLE DETECTION APPARATUS, SUBTITLE DETECTION METHOD AND PULL-DOWN SIGNAL DETECTION APPARATUS

CROSS-REFERENCE TO RELATED APPLICATIONS

This application is based upon and claims the benefit of priority from Japanese Patent Application No. 2006-083927, filed Mar. 24, 2006, the entire contents of which are incorporated herein by reference.

BACKGROUND

1. Field

Embodiments of the present invention relate generally to an apparatus which converts an interlaced-scan video signal to a progressive-scan video signal, and more particularly to an apparatus which detects a subtitle in an interlaced-scan video signal such as a moving picture signal that is generated by 2-3 pull-down or 2-2 pull-down.

2. Description of the Related Art

In the case of an NTSC video signal that is generally used as a TV broadcast signal, a video image is scanned by an interlaced-scan system. In this system, the equivalent number of images per second is increased, and thereby surface flicker is reduced. On the other hand, in recent years, thin TV receivers, such as liquid crystal display (LCD) devices or plasma display devices, have steadily been gaining popularity. If interlaced-scan video signals are directly displayed on the scan lines on such thin TV receivers, the brightness of the screen would considerably lower and displayed images would not be worth viewing. To avoid this problem, in these display devices, images are displayed by a progressive-scan system. When an interlaced-scan video signal is to be displayed on a progressive-scan display device such as an LCD device, an interlaced-scan/progressive-scan conversion circuit is required.

In some cases, standard TV video signals, such as NTSC signals, include video signals which are produced on the basis of cinema films. The cinema film has 24 frames per second, while the standard TV video signal is an interfaced-scan video signal with 30 frames per second (60 fields per second). Thus, the video signal of the cinema film is converted to the standard TV video signal by a 2-3 pull-down method or a 2-2 pull-down method. In the description below, an interlaced-scan video signal, which is obtained by the conversion from the video signal of the cinema film, is referred to as "pull-down signal".

For example, in the 2-3 pull-down method, a cinema film is first scanned to produce an interlaced-scan video signal with a frame frequency of 24 Hz. Then, the interlaced-scan video signal is converted such that the first frame of the cinema film may correspond to first and second fields (2 fields), the second frame to third to fifth fields (3 fields), the third frame to sixth and seventh fields (2 fields), and the fourth frame to eighth to tenth fields (3 fields). In the field signal which is converted to the pull-down signal, odd fields and even fields are alternately repeated. When the frame of the cinema film is converted to 3 fields, the last field (fifth field, tenth field) is the repetition of the same video content as the first field (third field, eighth field).

In this manner, two frames of the cinema film are made to correspond to five fields of the standard TV video signal, and the 2-field video signals and 3-field video signals are alternately repeated in accordance with the frames of the cinema film. Thus, the pull-down signal is generated.

In order to convert the pull-down signal to a progressive-scan signal, it is necessary to combine two fields, which are generated from the same frame of the cinema film, into one frame. A progressive-scan conversion apparatus, which realizes this process, determines whether the input video signal is a pull-down signal or not. If the input video signal is a pull-down signal, the apparatus determines fields to be combined (hereinafter referred to as "pair field"). By combining these fields, a progressive-scan signal is generated. This signal process is called "pull-down interpolation process".

In some cases, video such as cinema includes a subtitle. Regardless of whether the video signal is a pull-down signal or not, the subtitle is configured such that the same character pattern is mixed in the video over a plurality of frames. In the case where a subtitle is included in the pull-down signal, it is difficult to determine whether the video signal is the pull-down signal or not.

Jpn. Pat. Appln. KOKAI Publication No. 2002-057993 (Patent Document 1) discloses a technique wherein when an input video signal is the above-described pull-down signal, a 2-3 pull-down interpolation process is executed if no subtitle region is detected, and an IP conversion signal is generated on the basis of a motion-adaptive interpolation process if a subtitle region is detected.

The above-mentioned Patent Document 1 does not describe a specific structure for detecting the subtitle. Thus, in the prior art, it is not possible to precisely detect a subtitle region and to exactly execute a pull-down interpolation process.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter. In general, according to one embodiment of the present invention, there is provided a subtitle detection apparatus comprising: a difference unit 13 to provide an inter-field difference between a current field signal of an input video signal and the current field signal delayed by at least one field period; an integration unit 14 to divide a screen into a plurality of regions, integrate the inter-field difference that is included in each of the plurality of regions, and provide an intra-region integration value; and a first comparison unit 15 to compare the intra-region integration value from the integration unit with a first comparison value in order to detect if a subtitle is detected in at least one of the plurality of regions.

According to the embodiment, it is possible to precisely detect a subtitle region in a pull-down signal and to satisfactorily detect a pull-down signal.

Embodiments of the present invention will now be described in detail with reference to the accompanying drawings.

Figure 1:
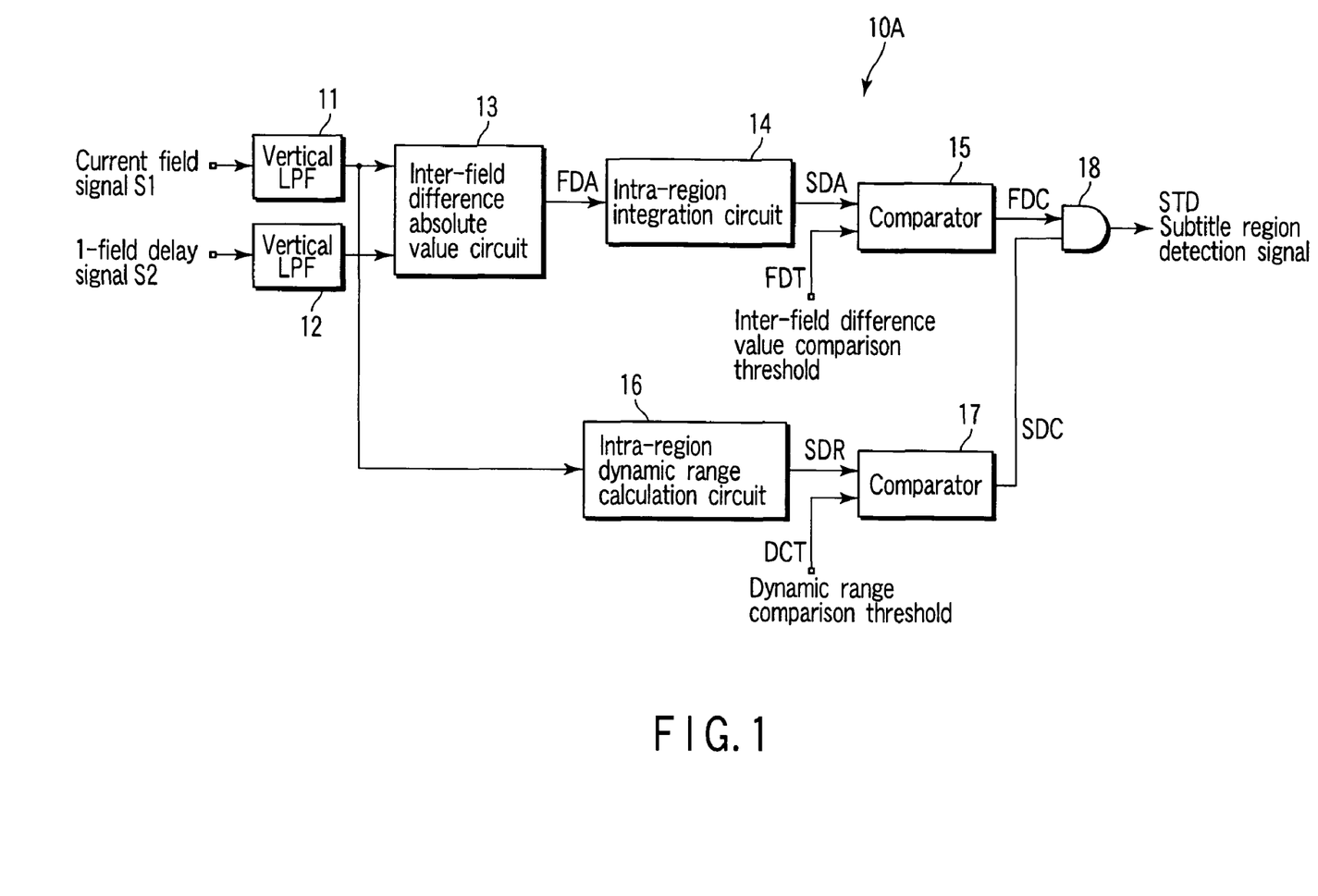
FIG. 1 is a block diagram that shows the structure of a subtitle detection apparatus 10A according to a first embodiment of the present invention.

FIG. 1 is a block diagram that shows the structure of a subtitle detection apparatus 10A according to a first embodiment of the present invention.

A current field signal (luminance signal) S1 passes through a first vertical low-pass filter (LPF) 11, and is then input to an inter-field difference absolute value circuit 13 and to an intra-region dynamic range calculation circuit 16. A 1-field delay signal S2 passes through a second vertical LPF 12, and is then input to the inter-field difference absolute value circuit 13. The 1-field delay signal S2 is a signal which is obtained by delaying the current field signal S1 by a 1-field period by using a memory circuit, as will be described later in detail with reference to FIG. 8. The first and second vertical LPFs 11 and 12 remove vertical high-frequency noise in 1 field, and align vertical median points of the current field signal S1 and 1-field delay signal S2. A horizontal LPF may be used for the noise removing filter.

The inter-field difference absolute value circuit (difference unit) 13 calculates, on a pixel-by-pixel basis, a difference absolute value FDA between the aforementioned two input field signals. The inter-field difference absolute value FDA is supplied to an intra-region integration circuit 14. The intra-region integration circuit (integration unit) 14 adds difference absolute values FDA in units of a rectangular region of, e.g. horizontal 8 pixels×vertical 8 lines, or horizontal 16 pixels× vertical 8 lines, and outputs a region difference addition value SDA. A first comparator 15 compares the region difference addition value SDA with a difference comparison threshold value FDT in units of the region, and outputs a difference comparison result FDC.

Figure 2A:
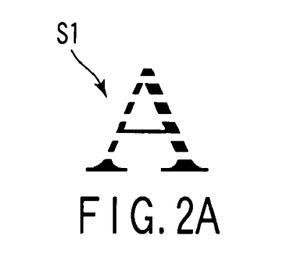
FIG. 2A and FIG. 2B show examples of a subtitle in a field signal.
Figure 2B:
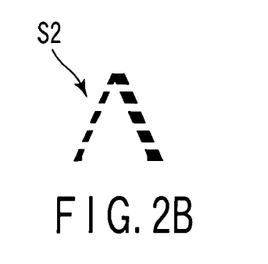

FIG. 2A and FIG. 2B show examples of a subtitle in the field signal. FIG. 2A and FIG. 2B show a character "A" in a subtitle. FIG. 2A shows a current field signal S1, and FIG. 2B shows a 1-field delay signal S2. If a difference between the field signals S1 and S2 is calculated, many large-value differences are obtained, compared to the case of an ordinary field signal including no subtitle character. Thus, the difference addition (integration) value SDA, which is output from the intra-region integration circuit 14, becomes greater than the difference comparison threshold value FDT, and the first comparator 15 outputs, for example, an H level signal as the difference comparison result FDC.

The intra-region dynamic range calculation circuit 16 calculates a dynamic range of the current field signal S1, which is filtered by the vertical LPF 11, in the aforementioned region. Specifically, the calculation circuit 16 outputs, as an intra-region dynamic range SDR, a difference between a maximum value and a minimum value of the current field signal S1 in the aforementioned region. A second comparator 17 compares the intra-region dynamic range SDR with a dynamic range comparison threshold value DCT, and outputs a dynamic range comparison result SDC.

In general, a character in the subtitle region is displayed in white, that is, with a highest luminance. Accordingly, the dynamic range of the subtitle region has, in general, a high value. If the dynamic range SDR is greater than the dynamic range comparison threshold value DCT, the comparator 17 outputs, for example, an H level signal as the dynamic range comparison result SDC.

In accordance with one embodiment of the invention, arithmetic unit (e.g., combinatorial logic including an AND circuit) 18 performs a logical operation (e.g., an AND operation) between the difference comparison result FDC and dynamic range comparison result SDC, and outputs a subtitle region detection signal STD. Specifically, if the difference integration value SDA is greater than the difference comparison threshold value FDT and if the dynamic range SDR is greater than the dynamic range comparison threshold value DCT with respect to the above-mentioned region, the arithmetic circuit 18 determines that the region is a part of a subtitle region and outputs, e.g. a high (H) level signal as the subtitle region detection signal STD.

As described above, when the subtitle region is to be detected, not only the integration value of the inter-field difference absolute value in the region but also the dynamic range is determined. Thereby, the precision in detection can be enhanced.

Figure 3:
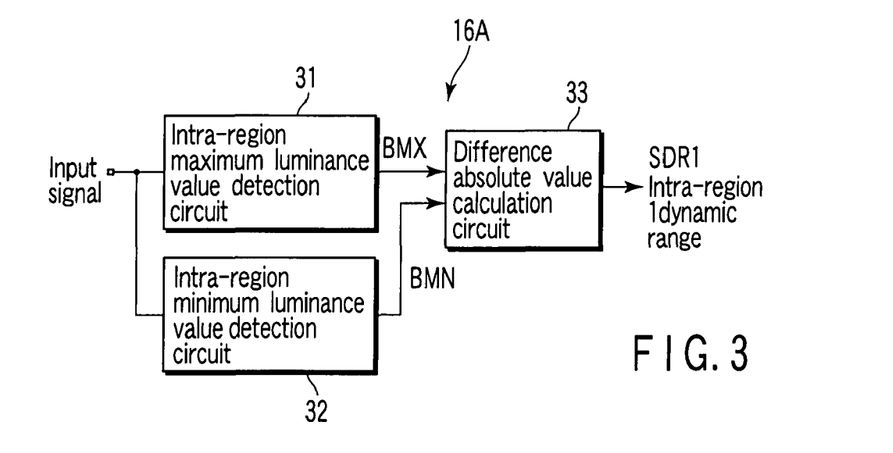
FIG. 3 shows a dynamic range calculation circuit 16A as a first embodiment of a dynamic range calculation circuit 16.

FIG. 3 shows a dynamic range calculation circuit 16A as a first embodiment of the dynamic range calculation circuit 16.

An intra-region maximum luminance value detection circuit 31 receives the current field signal S1 from the vertical LPF 11 and detects a maximum luminance value BMX in the region. An intra-region minimum luminance value detection circuit 32 receives the current field signal S1 from the vertical LPF 11 and detects a minimum luminance value BMN in the region. A difference absolute value calculation circuit 33 calculates a difference absolute value between the maximum luminance value BMX and the minimum luminance value BMN and outputs the calculated value as an intra-region dynamic range SDR1.

Figure 4:
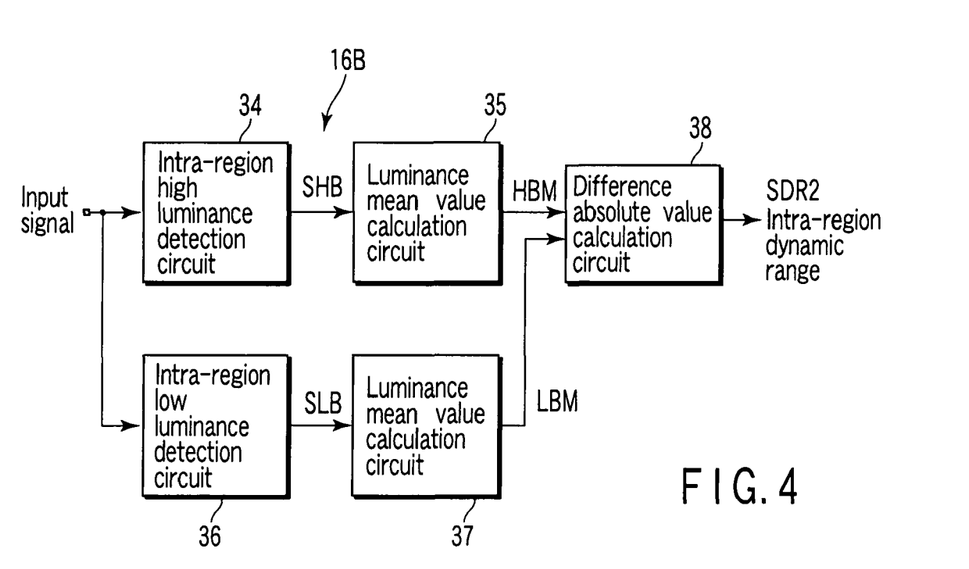
FIG. 4 shows a dynamic range calculation circuit 16B as a second embodiment of the dynamic range calculation circuit 16.

FIG. 4 shows a dynamic range calculation circuit 16B as a second embodiment of the dynamic range calculation circuit 16.

An intra-region high luminance detection circuit 34 receives the current field signal S1 from the vertical LPF 11, extracts first to n-th high luminance values in the region, and outputs the extracted values as high luminance SHB. A high luminance mean value calculation circuit 35 calculates a mean value HBM of the high luminance SHB. For example, if n is 4, a highest luminance in the region is 100, a second highest luminance in the region is 99, the number of pixels with luminance 100 is 1 and the number of pixels with luminance 99 is 4, the high luminance mean value calculation circuit 35 calculates (100+99*3)/4 as a high luminance mean value HBM, and outputs 99.25 as the high luminance mean value HBM.

An intra-region low luminance detection circuit 36 receives the current field signal S1 from the vertical LPF 11, extracts first to n-th low luminance values in the region, and outputs the extracted values as low luminance SLB. A low luminance mean value calculation circuit 37 calculates a mean value LBM of the low luminance SLB. For example, if n is 4, a lowest luminance in the region is 1, a second lowest luminance in the region is 2, the number of pixels with luminance 1 is 1 and the number of pixels with luminance 2 is 4, the low luminance mean value calculation circuit 36 calculates (1+2*3)/4 as a low luminance mean value LBM, and outputs 1.75 as the low luminance mean value LBM. A difference absolute value calculation circuit 38 calculates a difference absolute value between the high luminance mean value HBM and the low luminance mean value LBM and outputs the calculated value as an intra-region dynamic range SDR2.

Thus, the dynamic range calculation circuit 16B, compared to the dynamic range calculation circuit 16A, can suppress the effect of noise.

Next, a modification of the dynamic range calculation circuit 16B is described. In this modification, the intra-region high luminance detection circuit 34 extracts first to n-th high luminance values in the region with respect to the pixels, from which one or a predetermined number of pixels with highest luminance are excluded, and outputs the extracted values as high luminance SHB. The intra-region low luminance detection circuit 36 extracts first to n-th low luminance values in the region with respect to the pixels, from which one or a predetermined number of pixels with lowest luminance are excluded, and outputs the extracted values as low luminance SLB. The operations of the other circuit blocks are the same as described above.

In a case where, for example, one pixel with highest luminance due to noise is included in a region including no subtitle, the dynamic range of the region is greatly affected by the noise and the region may possibly be determined to be a subtitle region. Similarly, in a case where, for example, one pixel with lowest luminance due to noise is included in a region including no subtitle, the dynamic range of the region is greatly affected by the noise and the region may possibly be determined to be a subtitle region. Therefore, in this modification, the effect of noise included in the region can further be suppressed in the calculation of the dynamic range.

Figure 5:
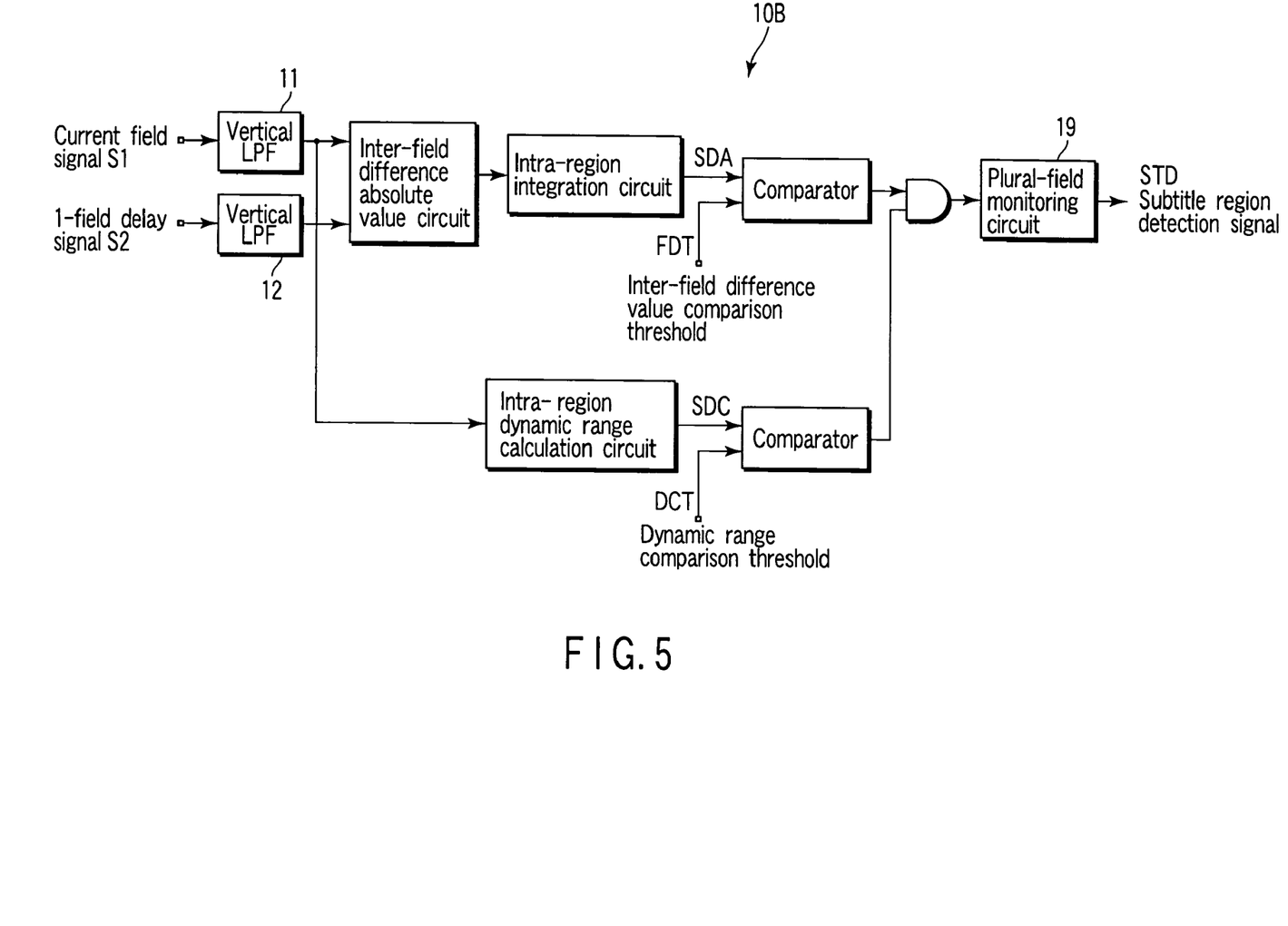
FIG. 5 is a block diagram that shows the structure of a subtitle detection apparatus 10B according to a second embodiment of the present invention.

FIG. 5 is a block diagram that shows the structure of a subtitle detection apparatus 10B according to a second embodiment of the present invention. The subtitle detection apparatus 10B further includes a multi-field monitoring circuit 19 in addition to the structure of the subtitle detection apparatus 10A shown in FIG. 1.

The multi-field monitoring circuit 19 determines the region as a subtitle region when the subtitle region determination condition, which has been described in connection with the first embodiment shown in FIG. 1, is continuously established for a predetermined number of fields or more. Specifically, if the condition that the difference integration value SDA is greater than the difference comparison threshold value FDT and the dynamic range SDR is greater than the dynamic range comparison threshold value DCT with respect to the above-mentioned region is continuously established for a predetermined number of fields or more, the multi-field monitoring circuit 19 determines the region to be a subtitle region.

The subtitle detection apparatus 10B according to the second embodiment can eliminate erroneous detection of a subtitle region owing to noise, etc. In short, in the subtitle detection apparatus 10B, compared to the subtitle detection apparatus 10A, the detection result of the subtitle region is delayed by the predetermined number of fields, but the reliability of the detection result can be enhanced.

Figure 6:
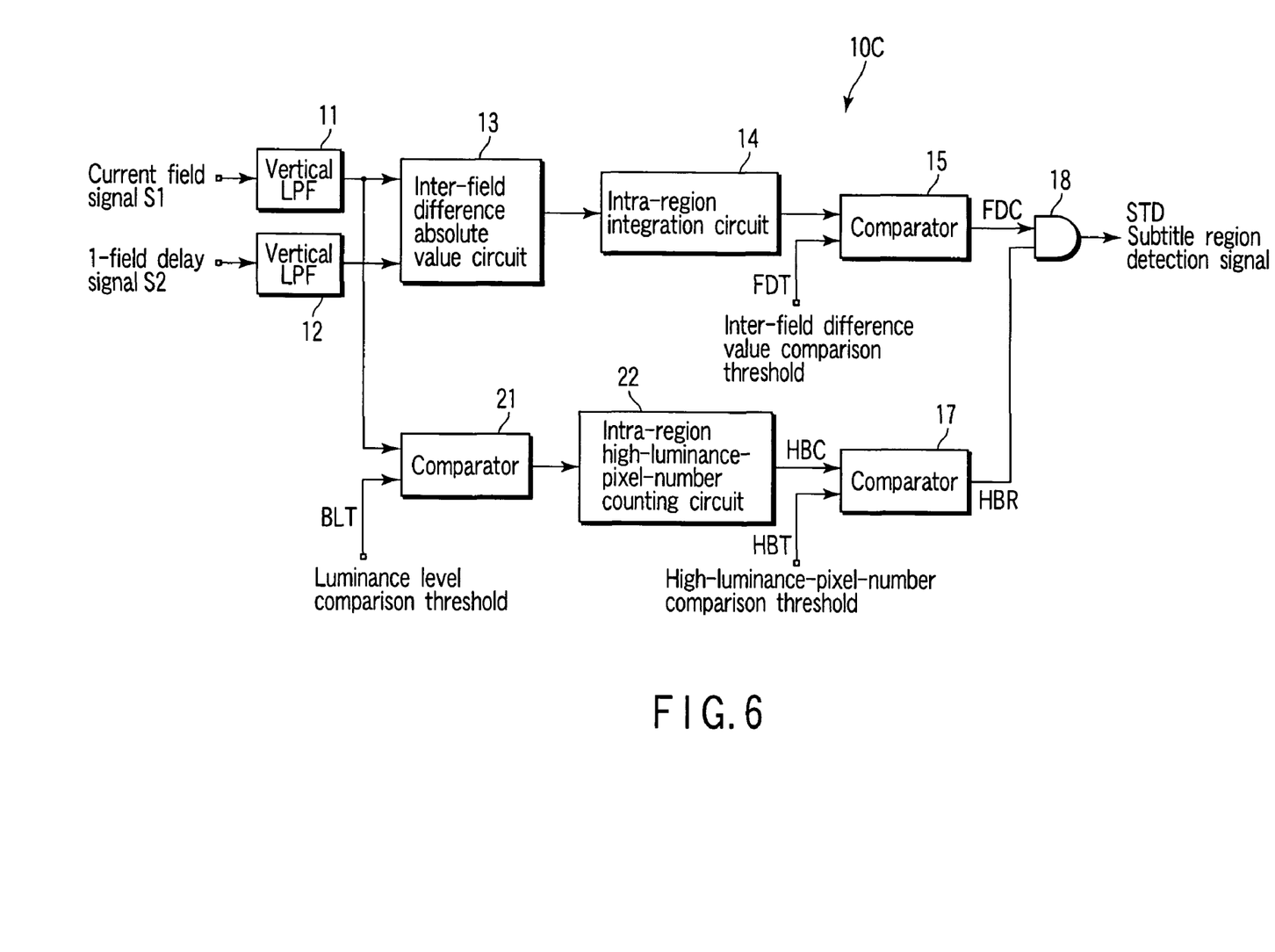
FIG. 6 is a block diagram that shows the structure of a subtitle detection apparatus 10C according to a third embodiment of the present invention.

FIG. 6 is a block diagram that shows the structure of a subtitle detection apparatus 10C according to a third embodiment of the present invention. The subtitle detection apparatus 10C includes a comparator 21 and an intra-region high-luminance-pixel-number counting circuit 22, which are substituted for the dynamic range calculation circuit 16 of the subtitle detection apparatus 10A shown in FIG. 1.

As described above, in general, a character in a subtitle region is displayed in white with maximum luminance. By the comparator 21, intra-region high-luminance-pixel-number counting circuit 22 and comparator 23, the number of pixels with high luminance in the region is counted and if the number of high-luminance pixels is greater than a comparison threshold value HBT, the region is determined to be a subtitle region.

The comparator 21 compares the current field signal S1 from the vertical LPF 11 with a luminance level comparison threshold value BLT. If the value of the current field signal S1 is greater than the comparison threshold value BLT, the comparator 21 outputs one H level pulse. The counting circuit 22 counts output pulses from the comparator 21 and outputs a count result HBC. The comparator 23 compares the count result HBC with a high-luminance-pixel-number comparison threshold value HBT, and outputs a comparison result HBR. The operations of the circuit blocks, other than the comparator 21, counting circuit 22 and comparator 23, are the same as those in the subtitle detection apparatus 10A shown in FIG. 1.

Figure 7:
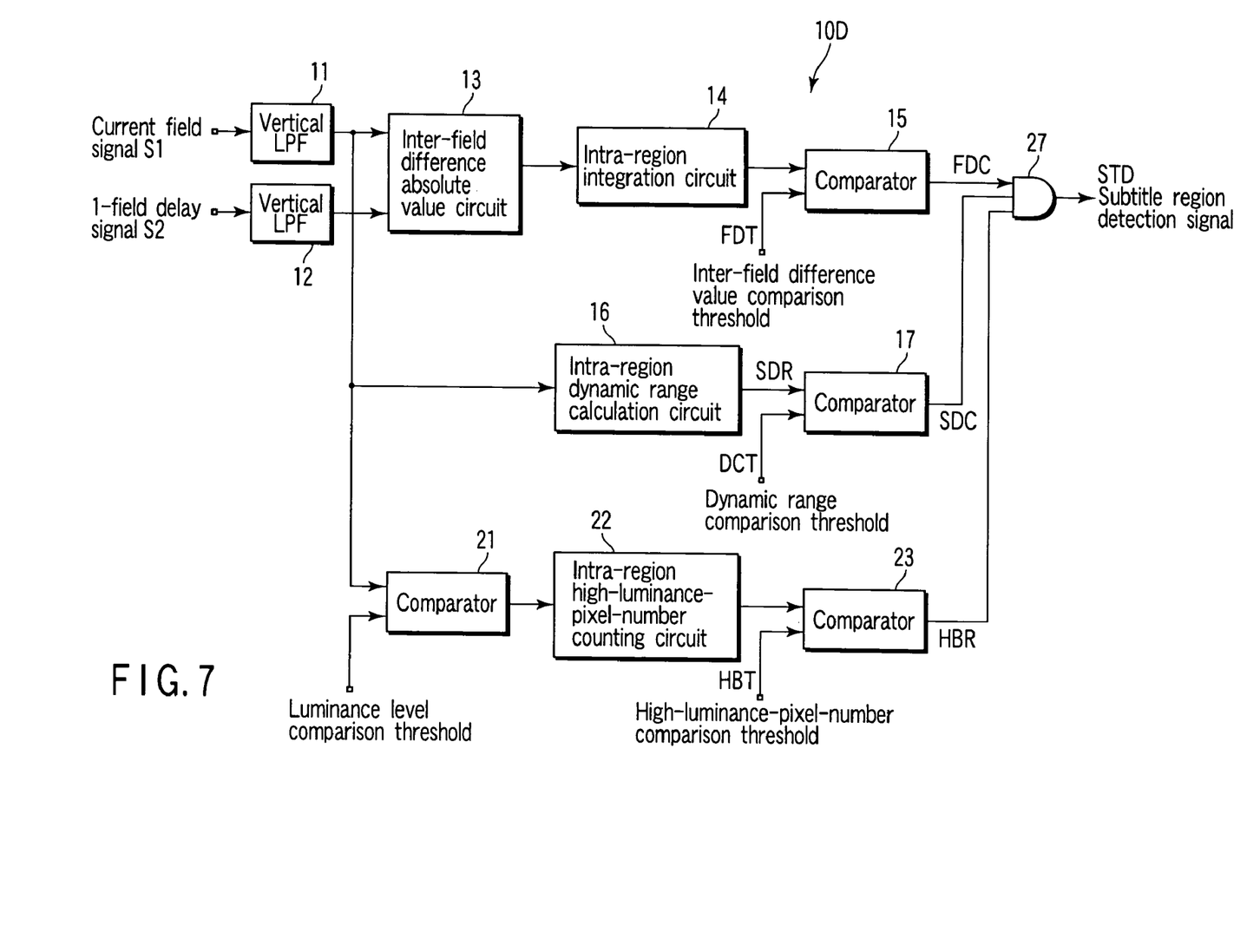
FIG. 7 is a block diagram that shows the structure of a subtitle detection apparatus 10D according to a fourth embodiment of the present invention.

FIG. 7 is a block diagram that shows the structure of a subtitle detection apparatus 10D according to a fourth embodiment of the present invention. The subtitle detection apparatus 10D includes the comparator 21, counting circuit 22 and comparator 23 shown in FIG. 6, in addition to the structure of the subtitle detection apparatus 10A shown in FIG. 1. The subtitle region detection precision of the subtitle detection apparatus can be enhanced by increasing the number of conditions for determining whether the aforementioned region is a subtitle region or not.

Figure 8:
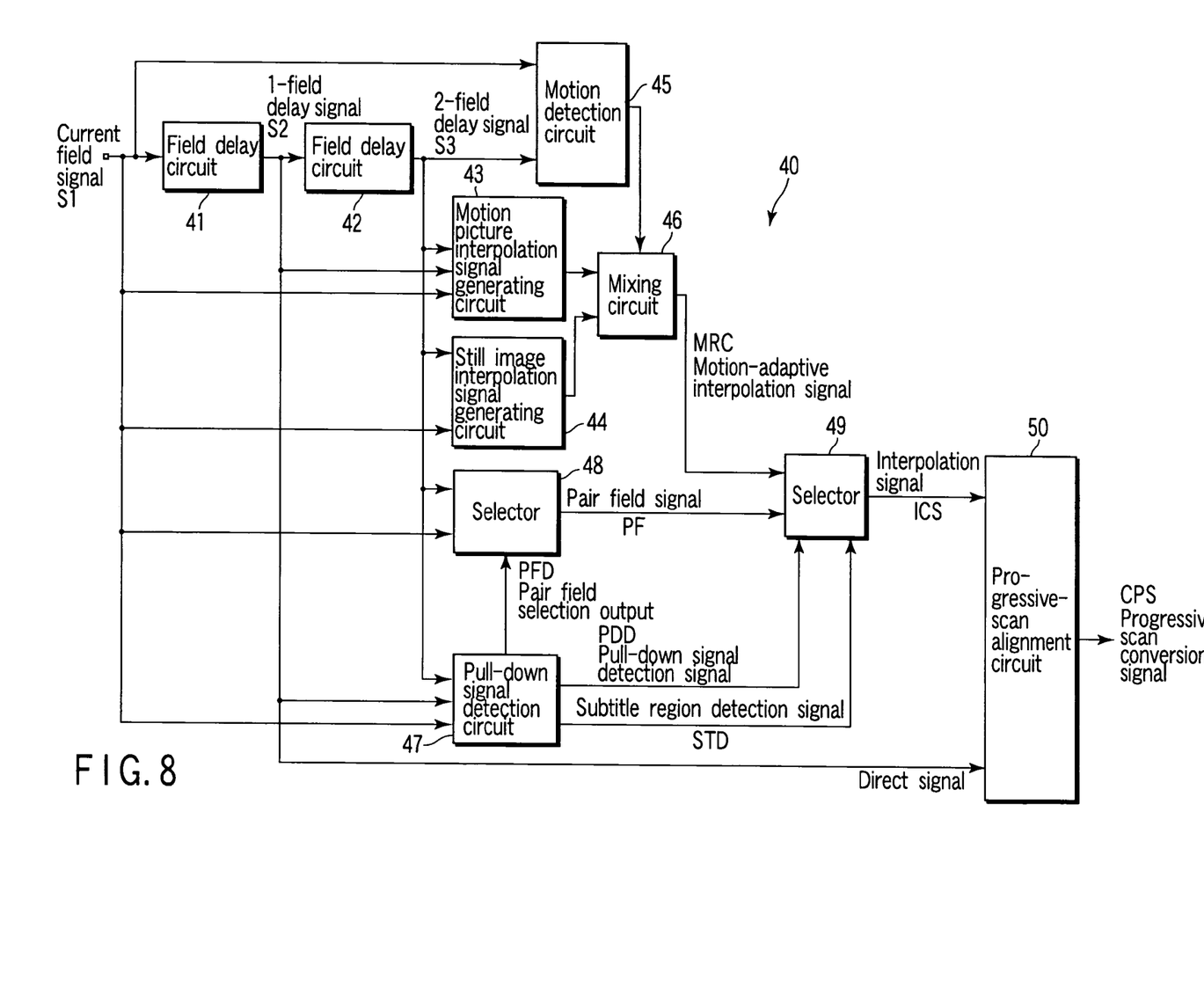
FIG. 8 shows an example of a progressive-scan apparatus 40 to which the present invention is applied.

FIG. 8 shows an example of a progressive-scan apparatus 40 to which the present invention is applied. A pull-down signal detection circuit 47 in FIG. 8 includes the subtitle detection apparatus 10D according to the embodiment of the invention shown in FIG. 7.

A current field signal S1, which is an interlaced-scan input luminance signal, is input to a first field delay circuit 41, and is output as a 1-field delay signal S2 with a delay of 1 field. The field delay circuit 41 includes, for example, two 1-field memory areas. Input 1-field video signals are alternately recorded in the two memory areas. Similarly, the recorded video signals are alternately read out of the two memory areas. Thus, while the recorded current field signal is being read out of the first field delay circuit 41 as the 1-field delay signal S2, the next current field signal is recorded in the first field delay circuit 41 as the field signal S1. The 1-field delay signal S2 is input to a second field delay circuit 42 and is output as a 2-field delay signal S3 with a delay of 1 field. The structure and operation of the second field delay circuit 42 are the same as those of the first field delay circuit 41.

Figure 9A:
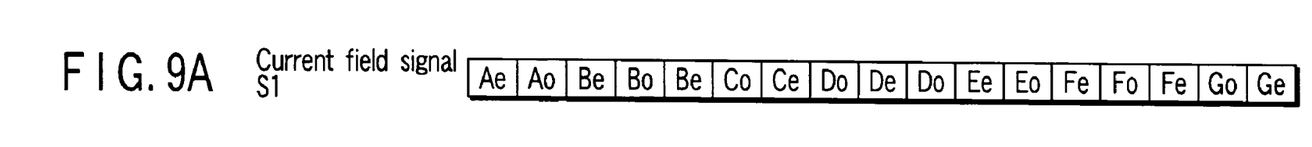
FIG. 9A to FIG. 9C illustrate how an interlaced-scan 2-3 pull-down signal is delayed.
Figures 9B, 9C:
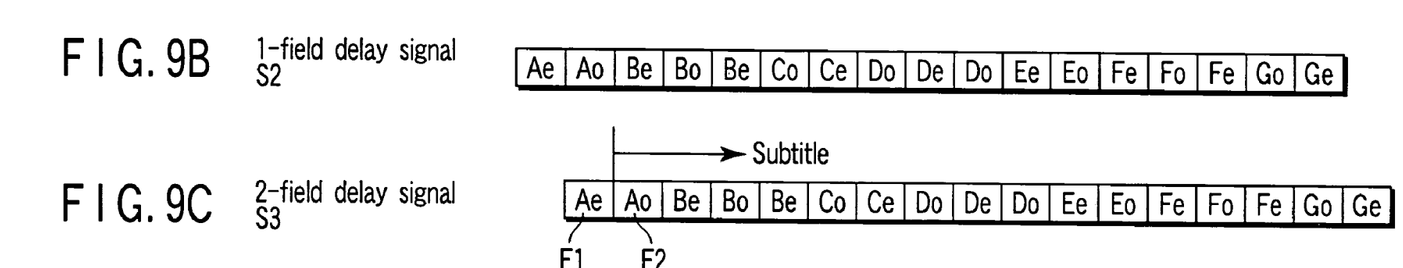

FIG. 9A to FIG. 9C illustrate a scheme in which an interlaced-scan 2-3 pull-down signal is delayed. FIG. 9A shows an input current field signal (2-3 pull-down signal) S1. In the signal S1, Ae is an even field that is generated from a frame A of a cinema film, and Ao is an odd field that is generated from the frame A of the cinema film. Similarly, Be is an even field that is generated from a frame B of the cinema film, and Bo is an odd field that is generated from the frame B of the cinema film. The same applies to Ce, Co, . . . . FIG. 9B shows a 1-field delay signal S2 that is obtained by delaying the signal of FIG. 9A by 1 field. FIG. 9C shows a 2-field delay signal S3 that is obtained by further delaying the signal of FIG. 9B by 1 field.

Figure 10:
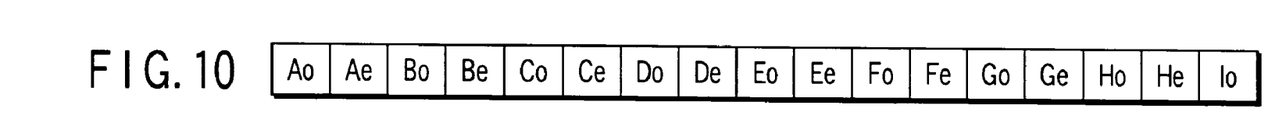
FIG. 10 shows an interlaced-scan 2-2 pull-down signal as another system of the pull-down signal.

FIG. 10 shows an interlaced-scan 2-2 pull-down signal as another example of the pull-down signal. The 2-2 pull-down signal is a video signal comprising odd fields and even fields which are generated from associated frames of a cinema film. Like the 2-3 pull-down signal, the 2-2 pull-down signal is delayed by each of the field delay circuits by 1 field.

Referring back to FIG. 8, a motion picture interpolation signal generating circuit 43 generates, from the current field signal S1, 1-field delay signal S2 and 2-field delay signal S3, a motion picture interpolation signal which is positioned between scan lines of the 1-field delay signal S2, for example, by motion compensation interpolation using motion vectors. A still image interpolation signal generating circuit 44 generates, from the current field signal S1 and 2-field delay signal S3, a still image interpolation signal which is positioned between scan lines of the 1-field delay signal S2, for example, by averaging the current field signal S1 and 2-field delay signal S3, or by using the value of the 2-field delay signal S3 itself.

A motion detection circuit 45 detects inter-frame motion on the basis of the current field signal S1 and 2-field delay signal S3, and outputs a motion detection signal to a mixing circuit 46. The mixing circuit 46 varies a mixing ratio in accordance with the motion detection signal, and mixes the motion picture interpolation signal and the still image interpolation signal, thereby generating a motion-adaptive interpolation signal MRC.

A pull-down signal detection circuit 47 detects whether the 1-field delay signal S2 is a pull-down signal or not, on the basis of the current field signal S1, 1-field delay signal S2 and 2-field delay signal S3, and generates a pull-down signal detection signal PDD and a pair field selection signal PFD.

Figure 11:
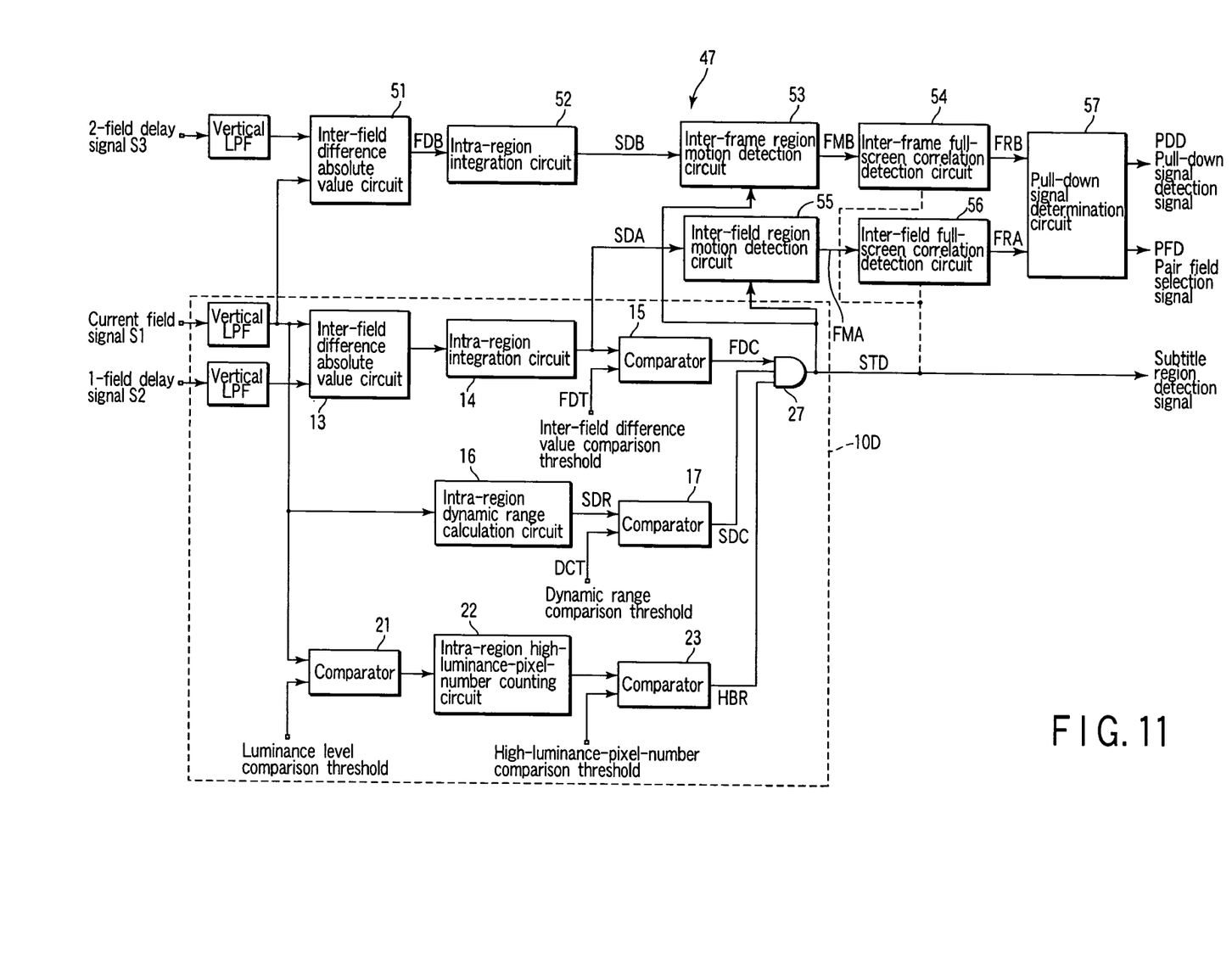
FIG. 11 shows a first embodiment of a pull-down signal detection circuit 47 according to the invention.

FIG. 11 shows a first embodiment of the pull-down signal detection circuit 47 according to the invention. The pull-down signal detection circuit 47 includes, as an example of the subtitle detection apparatus of the present invention, the subtitle detection apparatus 10D according to the fourth embodiment shown in FIG. 7. Thus, the circuit blocks, other than the subtitle detection apparatus 10D, are described below.

An inter-frame difference absolute value circuit 51 receives a current field signal S1 and a 2-field delay signal S3 via vertical LPFs. The inter-frame difference absolute value circuit 51 calculates a difference absolute value FDB between the two input signals on a pixel-by-pixel basis. An intra-region integration circuit 52 integrates (adds) difference absolute values within the region, and outputs an integration value SDB.

An inter-frame region motion detection circuit 53 detects an inter-frame motion (pixel value variation) of an intra-region image, on the basis of the integration value SDB, and outputs a motion detection result FMB. If the integration value SDB is greater than, e.g. a predetermined threshold value, the inter-frame region motion detection circuit 53 determines that an image is moving between frames (a pixel value variation is large), and outputs, e.g. an H level signal.

An inter-frame full-screen correlation detection circuit 54 detects a level of inter-frame correlation (similarity) on the full screen, on the basis of the motion detection result FMB, and outputs an inter-frame correlation detection result FRB. For example, the inter-frame full-screen correlation detection circuit 54 sums the number of regions in 1 screen, in which an image is determined to be moving (i.e. a pixel value variation is large). If the sum is greater than a predetermined threshold value, the inter-frame full-screen correlation detection circuit 54 outputs "weak" (e.g. 0) as the 1-screen correlation detection result FRB.

An inter-field region motion detection circuit 55 detects an inter-field motion (pixel value variation) of an intra-region image, on the basis of the integration value SDA, and outputs a motion detection result FMA. If the integration value SDA is greater than, e.g. a predetermined threshold value, the inter-field region motion detection circuit 55 determines that an image is moving between fields (a pixel value variation is large), and outputs, e.g. an H level signal.

An inter-field full-screen correlation detection circuit 56 detects a level of inter-field correlation on the full screen, on the basis of the motion detection value FMA, and outputs an inter-field full-screen correlation detection result FRA. For example, the inter-field full-screen correlation detection circuit 56 sums the number of regions in 1 screen, in which an image is determined to be moving (i.e. a pixel value variation is large). If the sum is greater than a predetermined threshold value, the inter-field full-screen correlation detection circuit 56 outputs "weak" (e.g. 0) as the 1-screen correlation detection result FRA.

In a case where the detection result STD of the subtitle detection apparatus 10D indicates "subtitle" (e.g. 1), each of the inter-frame region motion detection circuit 53 and the inter-field region motion detection circuit 55 outputs the signal (e.g. 0) indicating that an image is not moving. In normal cases, as regards the subtitle region, each of the inter-frame region motion detection circuit 53 and inter-field region motion detection circuit 55 determines that an image is moving (a pixel value variation is large) whether the background image is a still image or a moving image. Thus, in the present embodiment, as regards the subtitle region, output signals of both the inter-frame region motion detection circuit 53 and inter-field region motion detection circuit 55 are set at 0 (no motion). Thereby, the probability of erroneous detection of image motion can greatly be reduced.

In another embodiment, in a case where the detection result of the subtitle detection apparatus 10D indicates "subtitle" (e.g. 1), the number of regions in the full screen is reduced in the inter-frame full-screen correlation detection circuit 54 and inter-field full-screen correlation detection circuit 56. For example, in a case where 1 screen comprises 1000 regions and the number of regions, which are determined to be subtitle regions, is 100, the inter-frame full-screen correlation detection circuit 54 determines the level of inter-frame correlation on the basis of the detection result FMB with respect to the other 900 regions. Similarly, the inter-field full-screen correlation detection circuit 56 determines the level of inter-field correlation on the basis of the detection result FMA with respect to the other 900 regions. In this case, the subtitle region detection result STD is not delivered to the motion detection circuits 53 and 55 shown in FIG. 11, but is delivered to the inter-frame full-screen correlation detection circuit 54 and inter-field full-screen correlation detection circuit 56, as indicated by broken lines. Therefore, the levels of inter-frame correlation and inter-field correlation can be determined, without being affected by the subtitle regions.

A pull-down signal determination circuit 57 outputs a pull-down signal detection signal PDD which indicates whether the input video signal is a pull-down signal or not, on the basis of the inter-field correlation detection signal FRA and the inter-frame correlation detection signal FRB. In addition, the pull-down signal determination circuit 57 outputs a pair field signal PFD which indicates a pair field for the 1-field delay signal S2, on the basis of the correlation detection signal FRA and FRB.

FIG. 12A to FIG. 12E show examples of determination results of inter-field correlation and inter-frame correlation. It is assumed that a 2-3 pull-down signal is input to the apparatus.

Figure 12A:
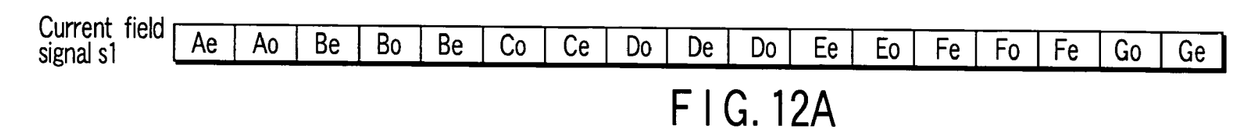
FIG. 12A to FIG. 12E show an example of determination results of an inter-field correlation and an inter-frame correlation of a 2-3 pull-down signal.
Figure 12B:
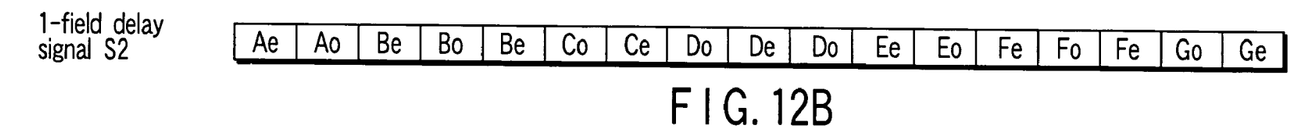
Figure 12C:
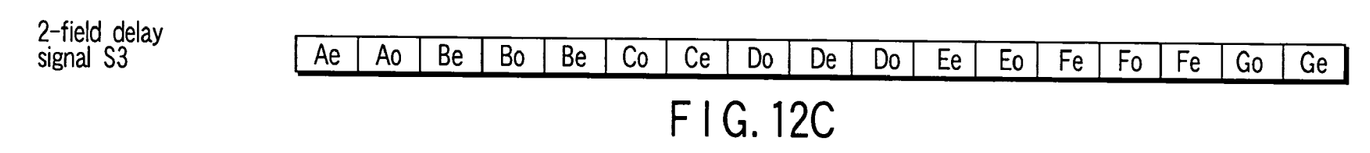
Figure 12D:
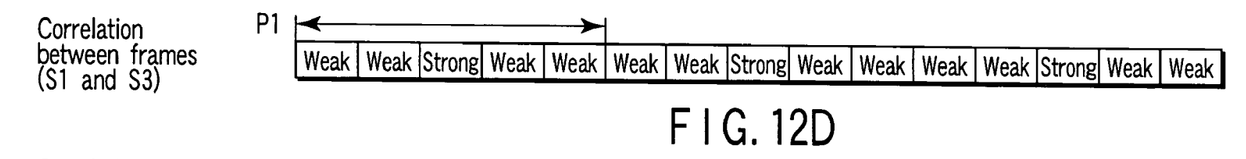
Figure 12E:
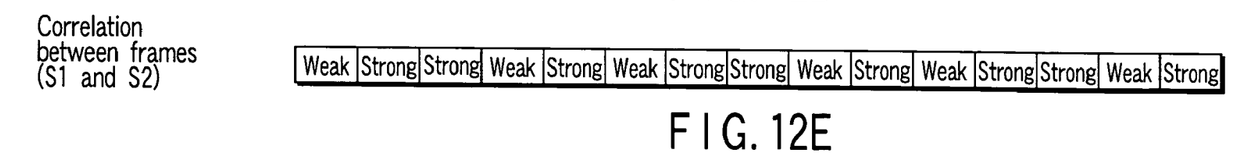

FIG. 12A shows a current field signal S1. FIG. 12B shows a 1-field delay signal S2. FIG. 12C shows a 2-field delay signal S3. FIG. 12D shows a correlation between frames (S1 and S3) (inter-frame correlation detection signal FRB). FIG. 12E shows a correlation between fields (S1 and S2) (inter-field correlation detection signal FRA).

For example, in the case where the 2-3 pull-down signal is input as shown in FIG. 12, the determination result of the inter-frame correlation detection circuit 54 with respect to successive fields is a repetition of a pattern of ("weak", "weak", "strong", "weak", "weak") as indicated in a period P1 in FIG. 12D. Thus, the pull-down signal determination circuit 57 detects this pull-down pattern. In the case of a 2-2 pull-down signal, the determination result of the inter-frame correlation detection circuit 54 with respect to successive fields is a pattern of (always "weak"). Thus, the pull-down signal determination circuit 57 detects this pull-down pattern.

In the case of the 2-3 pull-down signal, the determination result of the inter-field correlation detection circuit 56 with respect to successive fields is a repetition of a pull-down pattern of ("weak", "strong", "strong", "weak", "strong") as in a time period P1 in FIG. 12E. Thus, the pull-down signal determination circuit 57 detects this pull-down pattern.

When the detection result of the above-described pull-down pattern continues in a period of a predetermined number of fields, the pull-down signal determination circuit 57 determines, on the basis of the pull-down pattern, whether the field signal that is input to the apparatus is a pull-down signal, such as a 2-3 pull-down signal or a 2-2 pull-down signal.

If the field signal that is input to the apparatus is the pull-down signal, the pull-down signal determination circuit 57 outputs a pair field selection signal PFD which indicates whether a field that is paired with the 1-field delay signal S2 is the current field signal S1 or 2-field delay signal S3.

Referring back to FIG. 8, a first selector 48 selects, on the basis of the pair field selection signal PFD, one of the current field signal S1 and 2-field delay signal S3 as a field that is paired with the 1-field delay signal S2, and outputs the selected signal as a pair field signal PF to a second selector 49. If the pull-down signal detection signal PDD is indicative of a pull-down signal, the second selector 49 selects the pair field signal PF. Otherwise, the second selector 49 selects the motion-adaptive interpolation signal MRC. The second selector 19 outputs the selected signal as an interpolation signal ICS. In addition, if the subtitle region detection signal STD indicates the subtitle region, the selector 49 outputs the motion-adaptive interpolation signal MRC as the interpolation signal ICS.

A progressive-scan alignment circuit 50 orderly arranges (mixes) the interpolation signal ICS and the 1-field delay signal S2 which is a direct signal, and generates a progressive-scan conversion signal CPS.

In the case where the input video signal is a pull-down signal and the screen includes a subtitle region, the progressive-scan apparatus 40 according to the embodiment of the invention exactly detects the subtitle region in units of a region of, e.g. 8×8 pixels, and detects the pull-down signal on the basis of the video signal of the region other than the subtitle region. Therefore, the precision of detection of the pull-down signal can be improved.

In addition, according to the embodiment of the invention, the subtitle region in the pull-down signal is exactly detected in units of the region, and the progressive-scan conversion signal CPS is generated only with respect to the subtitle region, with the motion-adaptive interpolation signal MRC being used as the interpolation signal of the direct signal S2.

For example, in the case where a subtitle is inserted from a field F2 in FIG. 9C, if the prior-art pull-down interpolation process is performed, the fields F1 and F2 would be mixed as the first frame of the pull-down signal. As a result, a character, as shown in FIG. 2A, is displayed on the display screen. A phenomenon in which a character of subtitle is displayed in stripes is called "combing phenomenon".

In the present invention, as described above, the subtitle region is detected in units of a region, and fields are mixed only with respect to the subtitle region, with the motion-adaptive interpolation signal MRC being used as the interpolation signal of the direct signal S2. Hence, no combing phenomenon occurs even if the input video signal is the pull-down signal. In the subtitle region, the pull-down signal is ignored and the quality of the video image is slightly degraded. However, the region with degraded quality is limited to the background image near the contour of the character (i.e. within the width of the region). Furthermore, since the subtitle region generally appears at an end part of the screen, such as a lower part or an upper part of the screen, the degradation in the background image near the contour of the character does not pose a serious problem.

According to the embodiment of the invention, the precision in detection of the pull-down signal is enhanced, the combing phenomenon of the subtitle is prevented, and, as a result, clear video and subtitle (character string) can be displayed.

Next, another example of the pull-down signal detection circuit 47 is described.

Figure 13:
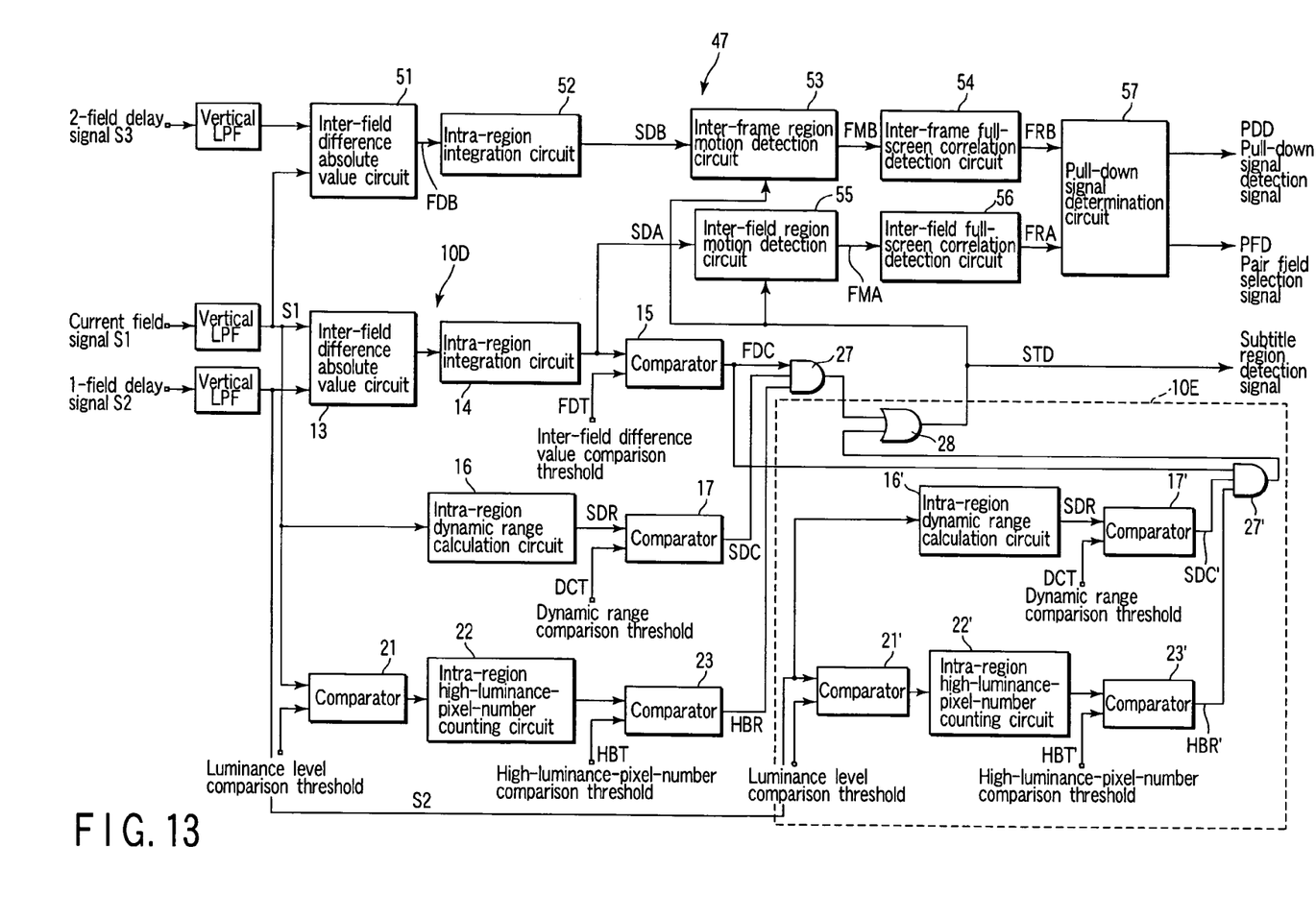
FIG. 13 is a block diagram showing the structure of a second embodiment of the pull-down signal detection circuit 47.

FIG. 13 is a block diagram showing the structure of a second embodiment of the pull-down signal detection circuit 47. The pull-down signal detection circuit 47 includes a subtitle detection apparatus 10E in addition to the structure of the pull-down signal detection circuit shown in FIG. 11. The subtitle detection apparatus 10E includes an intra-region dynamic range calculation circuit 16', a comparator 17', a comparator 21', an intra-region high-luminance-pixel-number counting circuit 22', a comparator 23', an AND circuit 27', and an OR circuit 28. The operation of the subtitle detection apparatus 10E is the same as that of the subtitle detection apparatus 10D.

The pull-down signal detection circuit 47 according to the embodiment shown in FIG. 13 executes not only the subtitle detection based on the current field signal S1, but also subtitle detection based on the 1-field delay signal S2 by means of the subtitle detection apparatus 10E. The inter-field difference absolute value circuit 13, intra-region integration circuit 14 and comparator 15 are shared by the subtitle detection apparatus 10D and subtitle detection apparatus 10E.

In the present embodiment, if a subtitle is present in either the current field signal S1 or the 1-field delay signal S2 in a region within the screen, the pull-down signal detection is executed with respect to the region from which this region is excluded. Thereby, in the pull-down signal detection process, it becomes possible to avoid not only the influence by the subtitle of the current field signal, but also the influence by the subtitle of the 1-field delay signal.

The blocks, which constitute the above-described embodiments of the invention, can be constructed as hardware composed of electronic circuits or process steps of software, as needed.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A subtitle detection apparatus comprising:
   a difference unit to provide an inter-field difference between a current field signal of an input video signal and the current field signal delayed by at least one field period;
   an integration unit to divide a screen into a plurality of regions, integrate the inter-field difference that is included in each of the plurality of regions, and provide an intra-region integration value;
   a first comparison unit to compare the intra-region integration value from the integration unit with a first comparison value in order to detect if a subtitle is detected in at least one of the plurality of regions;
   a dynamic range calculation unit to divide the screen into regions and calculates a dynamic range of luminance in each of the regions;
   a second comparison unit to compare the dynamic range calculated by the dynamic range calculation unit with a second comparison value, and to provide a dynamic range comparison result in units of the region; and
   an arithmetic unit to perform a logical operation between an integration value comparison result being a result produced by a comparison of the intra-region integration value and the first comparison value and the dynamic range comparison result, and to provide a result of the logical operation as a subtitle region detection signal.

2. The subtitle detection apparatus according to claim 1 further comprising a monitoring unit coupled to the arithmetic unit, the monitoring unit to determine that the region is a subtitle region when the subtitle region detection signal indicates that the subtitle region is continuously detected with respect to a predetermined number of fields.

3. The subtitle detection apparatus according to claim 1, further comprising:
   a counting unit to divide the screen into regions and to count a number of pixels with high luminance in each of the regions; and
   a third comparison unit coupled to the counting unit, the third comparison unit to compare the number of pixels with a predetermined threshold value, and to provide a high-luminance-pixel-number comparison result, and
   the arithmetic unit performing a logical operation between the integration value comparison result, the dynamic range comparison result, and the high-luminance-pixel-number comparison result.

4. The subtitle detection apparatus according to claim 1, further comprising a first filter to remove a high frequency noise component of the current field signal, and a second filter to remove a high frequency noise component of the delayed current field signal,
   the current field signal, the noise component of which is removed by the first filter, being supplied to the difference unit and the dynamic range calculation unit, and the delayed current field signal, the noise component of which is removed by the second filter, being supplied to the difference unit.

5. The subtitle detection apparatus according to claim 1, further comprising a first filter to remove a high frequency noise component of the current field signal, and a second filter to remove a high frequency noise component of the delayed current field signal, wherein
   the current field signal, the noise component of which is removed by the first filter, being supplied to the difference unit and the dynamic range calculation unit, and the delayed signal, the noise component of which is removed by the second filter, being supplied to the difference unit.

6. The subtitle detection apparatus according to claim 1, wherein the dynamic range calculation unit provides, as a dynamic range, a difference between a maximum luminance and a minimum luminance in the region in the current field.

7. The subtitle detection apparatus according to claim 1, wherein the dynamic range calculation unit provides, as a dynamic range, a difference between a mean value of luminances of a pixel with a first highest luminance to a pixel with an $n^{th}$ highest luminance in the region and a mean value of luminances of a pixel with a first lowest luminance to a pixel with an $n^{th}$ lowest luminance in the region.

8. A pull-down signal detection apparatus comprising:
   a first difference unit to provide an inter-frame difference between a current field signal of an input video signal and a 2-field delay signal of the current field signal;
   a first integration unit coupled to the first difference unit, the first integration unit to (i) divide a screen, composed of the input video signal, into a plurality of regions, (ii) integrate the inter-frame difference that is included in the regions, and (iii) provide an intra-region first integration value;
   a subtitle detection unit;
   an inter-frame correlation detection unit coupled to the subtitle detection unit, the inter-frame correlation detection unit to detect a level of inter-frame correlation based on the subtitle region detection signal output from the subtitle detection unit;
   an inter-field correlation detection unit coupled to the subtitle detection unit, the inter-field correlation detection unit to detect a level of inter-field correlation on the basis of the subtitle region detection signal, which is output from the subtitle detection unit, and the second integration value from the second integration unit; and
   a determination unit coupled to the inter-frame correlation detection unit and the inter-field correlation detection, the determination unit to determine whether the input video signal is a pull-down signal.

9. A pull-down signal detection apparatus of claim 8, wherein the subtitle detection unit comprises
   (a) a second difference unit to provide an inter-field difference between the current field signal of the input video signal and a delayed signal of the current field signal,
   (b) a second integration unit to divide the screen into a plurality of regions, integrate the inter-field difference that is included in each of the regions, and provide an intra-region second integration value;
   (c) a first comparison unit to compare the inter-region second integration value from the second integration unit with a first comparison value, and provide an integration value comparison result, (d) a dynamic range calculation unit to divide a screen, which is composed of the current field signal, into regions and calculate a dynamic range of luminance in each of the regions, (e) a second comparison unit to compare the dynamic range calculated by the dynamic range calculation unit with a second comparison value, and provide a dynamic range comparison result, and (f) a first arithmetic unit to perform a logical operation between the integration value comparison result of the first comparison unit and the dynamic range comparison result, and to provide a result of the logical operation as a subtitle region detection signal.

10. The pull-down signal detection apparatus according to claim 9, wherein the subtitle detection unit includes a plural-field monitoring unit to determine that the region is a subtitle region in a case where the subtitle region detection signal indicates that the subtitle region is continuously detected with respect to a predetermined number of fields.

11. The pull-down signal detection apparatus according to claim 9, wherein the subtitle detection unit further includes:
   a counting unit to divide the screen into regions and count a number of pixels with high luminance in each of the regions; and
   a third comparison unit to compare the number of pixels counted by the counting unit with a predetermined threshold value, and to provide a high-luminance-pixel-number comparison result,
   the first arithmetic unit executing a logical operation between the integration value comparison result of the first comparison unit, the dynamic range comparison result, and the high-luminance-pixel-number comparison result.

12. The pull-down signal detection apparatus according to claim 11, wherein the subtitle detection unit further includes:
   a second dynamic range calculation unit to divide a screen, which is composed of the delayed signal, into regions and calculates a dynamic range of luminance in each of the regions;
   a third comparison unit to compare the dynamic range calculated by the second dynamic range calculation unit with a third comparison value, and provide a second dynamic range comparison result;
   a second arithmetic unit to perform a logical operation between the integration value comparison result of the first comparison unit and the second dynamic range comparison result, and to provide a result of the logical operation; and
   a third arithmetic unit to perform a logical operation between the result of the logical operation of the first arithmetic unit and the result of the logical operation of the second arithmetic unit, and to provide a result of the logical operation as a subtitle region detection signal.

13. A subtitle detection method comprising:
   generating an inter-field difference between a current field signal of an input video signal and a delayed signal of the current field signal;
   dividing a screen, which is composed of the input video signal, into regions, integrating the inter-field difference that is included in each of the regions, and providing an intra-region integration value;
   comparing the intra-region integration value with a first comparison value, and providing an integration value comparison result;
   dividing the screen into regions and calculating a dynamic range of luminance in each of the regions;
   comparing the dynamic range with a second comparison value, and providing a dynamic range comparison result; and
   performing a logical operation between the integration value comparison result and the dynamic range comparison result to produce a result, and providing the result as a subtitle region detection signal.

14. The subtitle detection method according to claim 13, further comprising determining that the region is a subtitle region in a case where the subtitle region detection signal indicates that the subtitle region is continuously detected with respect to a predetermined number of fields.

15. The subtitle detection method according to claim 13, further comprising:
   dividing the screen into regions and counting a number of pixels with high luminance in each of the regions; and
   comparing the number of pixels with high luminance with a predetermined threshold value, and providing a high-luminance-pixel-number comparison result,
   wherein the logical operation is performed between the integration value comparison result, the dynamic range comparison result, and the high-luminance-pixel-number comparison result.

* * * * *